United States Patent
Ford

(10) Patent No.: US 9,762,584 B2
(45) Date of Patent: Sep. 12, 2017

(54) IDENTITY MANAGEMENT SYSTEM

(71) Applicant: ADP, LLC, Roseland, NJ (US)

(72) Inventor: James Caldwell Ford, Orleans, MA (US)

(73) Assignee: ADP, LLC, Roseland, NJ (US)

( * ) Notice: Subject to any disclaimer, the term of this patent is extended or adjusted under 35 U.S.C. 154(b) by 32 days.

(21) Appl. No.: 14/832,501

(22) Filed: Aug. 21, 2015

(65) Prior Publication Data

US 2017/0054729 A1 Feb. 23, 2017

(51) Int. Cl.
*H04L 29/06* (2006.01)

(52) U.S. Cl.
CPC ........... *H04L 63/101* (2013.01); *H04L 63/20* (2013.01)

(58) Field of Classification Search
CPC ...................................... H04L 63/101
USPC .............................................. 726/4
See application file for complete search history.

(56) References Cited

U.S. PATENT DOCUMENTS

| | | | |
|---|---|---|---|
| 6,256,737 B1 * | 7/2001 | Bianco | G07C 9/00158 713/186 |
| 6,584,466 B1 | 6/2003 | Serbinis et al. | |
| 8,842,319 B2 | 9/2014 | DeRoller | |
| 9,426,231 B2 * | 8/2016 | Yoshikawa | H04L 67/18 |
| 2006/0028689 A1 | 2/2006 | Perry et al. | |
| 2009/0292930 A1 * | 11/2009 | Marano | G06F 21/6218 713/189 |
| 2011/0047183 A1 | 2/2011 | Ford et al. | |
| 2011/0093471 A1 | 4/2011 | Brockway et al. | |
| 2013/0262333 A1 | 10/2013 | Wicker et al. | |

* cited by examiner

*Primary Examiner* — Longbit Chai
(74) *Attorney, Agent, or Firm* — Yee & Associates, P.C.

(57) ABSTRACT

A identity management system is provided for managing documents within an computer system. The computer system receives a document within an authentication context of a user. The computer system determines a chain of custody for the document. The computer system stores the document. The computer system sets document privileges for the document based on the authentication context and the chain of custody.

24 Claims, 9 Drawing Sheets

|     |            | PERSONA 1 | PERSONA 2 | PERSONA 3 | PERSONA 4 |
|-----|------------|-----------|-----------|-----------|-----------|
| 702 | ACCOUNT 1 |       |           |           |           |
| 718 | DOCUMENT 1 | ✓         |           |           |           |
| 720 | DOCUMENT 2 | ✓         |           |           |           |
|     |            |           |           |           |           |
| 704 | ACCOUNT 2 |       |           |           |           |
| 722 | DOCUMENT 3 |           | ✓         |           |           |
| 724 | DOCUMENT 4 |           | ✓         |           |           |
|     |            |           |           |           |           |
| 706 | ACCOUNT 3 |       |           |           |           |
| 726 | DOCUMENT 5 |           |           | ✓         |           |
| 728 | DOCUMENT 6 |           |           | ✓         |           |
|     |            |           |           |           |           |
| 708 | ACCOUNT 4 |       |           |           |           |
| 730 | DOCUMENT 7 |           |           |           | ✓         |
| 732 | DOCUMENT 8 |           |           |           | ✓         |

|  | PERSONA 1 | PERSONA 2 | PERSONA 3 | PERSONA 4 |
|---|---|---|---|---|
| ACCOUNT 1 | | | | |
| DOCUMENT 1 | ✓ | ✓ | ✓ | ✓ |
| DOCUMENT 2 | ✓ | ✓ | ✓ | ✓ |
| | | | | |
| ACCOUNT 2 | | | | |
| DOCUMENT 3 | | ✓ | | ✓ |
| DOCUMENT 4 | | ✓ | | ✓ |
| | | | | |
| ACCOUNT 3 | | | | |
| DOCUMENT 5 | ✓ | | ✓ | ✓ |
| DOCUMENT 6 | ✓ | | ✓ | ✓ |
| | | | | |
| ACCOUNT 4 | | | | |
| DOCUMENT 7 | | | | ✓ |
| DOCUMENT 8 | | | | ✓ |

FIG. 8

IDENTITY MANAGEMENT SYSTEM

BACKGROUND INFORMATION

1. Field

The present disclosure relates generally to an improved data processing system. In particular, the present disclosure relates to a method and apparatus for managing the various online profiles of a user. Still more particularly, the present disclosure relates to a method and apparatus for a graphical user interface used in managing online user profiles that allows a user to carry data from different sources to be verified by a chain of custody and stored in a secure manner that allows the end user to selectively and granularly present the data to other parties.

2. Background

Information systems are used for many different purposes. For example, an information system may be used to perform services for employer, such as the processing of payroll to generate paychecks for employees in an organization. Additionally, an information system also may be used by the employer's human resources department to maintain benefits, documents, qualifications, learning transcript, licenses, payroll records and other records about employees. However, these records and documents typically exist only within the context of the employee's current employment. One such employment terminates, these records and documents are only available from the former employee.

Many online employment services, job boards, and networking sites allow a user to upload a resume, transcripts, certifications, and other documents. The records and documents from a user's previous employment are often indicative of a skill set, education level, previous employment, and salary. These records and documents can therefore can provide insight into the online persona presented by a user in online employment services, job boards, and networking sites.

However, the majority of online employment services, job boards, and networking sites lack the functionality to attest to the veracity of these documents, or validate their authenticity. A user may have an incentive to alter documents within their possession in order to benefit in the future employment. Therefore, the veracity of documents that are uploaded to online employment services, job boards, and networking sites from a user's personal hard drive or computer system is suspect. Potential employers and other entities assessing the users online persona may lack confidence that the assertions and representations in the document have not been modified by the end user.

Therefore, it would be desirable to have a method and apparatus that take into account at least some of the issues discussed above, as well as other possible issues. For example, it would be desirable to have a method and apparatus that allows for artifacts from a user's previously employment to be stored in a secure manner, thereby establishing a chain of custody for the document exclusive of the end-user. Furthermore, it would be desirable to have a method and apparatus that allows the end user to selectively presented the stored documents/to other parties with a fine level of granularity.

SUMMARY

In one illustrative embodiment, a method for managing documents within an identity management system is presented. A computer system receives a document. The document is received within an authentication context of a user. The computer system determines a chain of custody for the document. The computer system stores the document. The computer system sets document privileges for the document based on the authentication context in the chain of custody.

In another illustrative embodiment, a computer system comprises a identity management system for managing documents within an identity management system. The identity management system receives a document. The document is received within an authentication context of a user. The identity management system determines a chain of custody for the document. The identity management system stores the document. The identity management system sets document privileges for the document based on the authentication context in the chain of custody.

In yet another illustrative embodiment, a computer program product for managing documents within an identity management system comprises a computer readable storage media, and program code stored on the computer readable storage media. The program code instructs an identity management system to receive the document. The document is received within a comment authentication context of the user. The program code instructs the identity management system to determine a chain of custody for the document. The program code instructs the identity management system to store the documents. The program code instructs the identity management system to set document privileges for the document based on the authentication context and the chain of custody.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a persona privileges interface shown within a graphical user interface showing default privileges for documents depicted in accordance with an illustrative embodiment;

FIG. 8 is an illustration of a persona privileges interface shown within a graphical user interface showing user modified privileges for documents depicted in accordance with an illustrative embodiment;

DETAILED DESCRIPTION

The illustrative embodiments recognize and take into account one or more different considerations. For example, the illustrative embodiments recognize and take into account that end users have multiple personas over time and that there is novelty and value to providing those end users with verified and secure management of their employment histories.

The illustrative embodiments recognize and take into account that managing various documents from a plurality of different employers within online profiles may be more difficult to compare than desired. The illustrative embodiments also recognize and take into account that attesting to the veracity of documents submitted from a user as part of an online profile may be more difficult than desired depending on the relationship between the profile manager and the service provider.

Thus, the illustrative embodiments provide a method and apparatus for managing and verifying various documents received from a plurality of different employers as part of an identity management system. Additionally, the embodiments provide method and apparatus for managing multiple identities and social providers and enables the association of one or more of these user accounts to the user persona and history.

Figure 1:
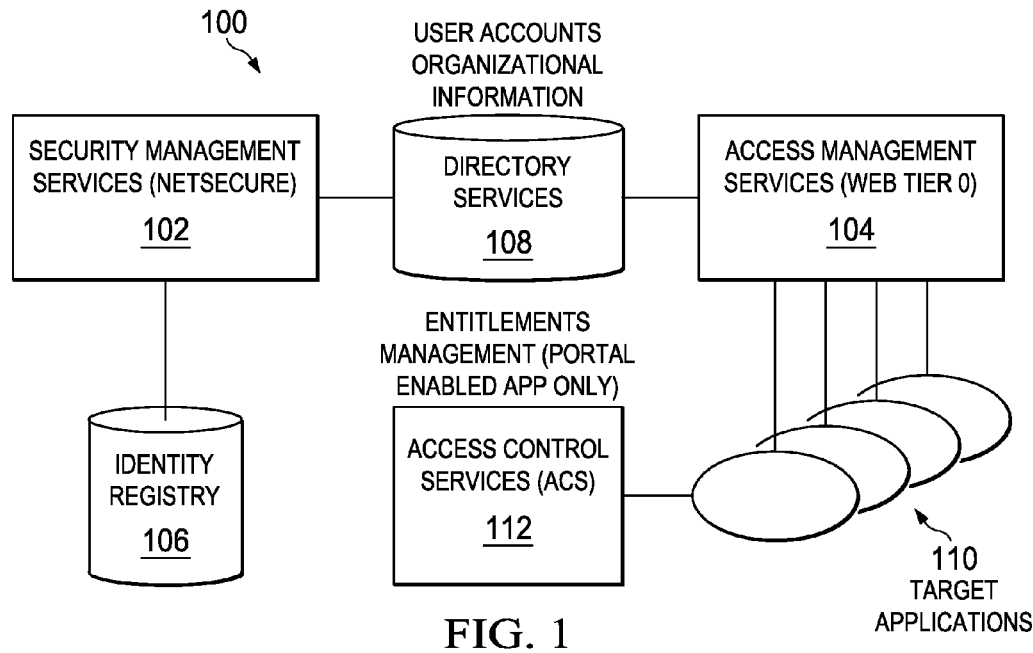
FIG. 1 is an illustration of a block diagram of an identity service solution depicted in accordance with an illustrative embodiment.

With reference now to the figures and in particular with reference to FIG. 1, an illustration of a block diagram of an identity service solution is depicted in accordance with an illustrative embodiment. As depicted, identity management system 100 separated the two main components: security management services 102 and access management services 104.

Security management services 102 is a set of components that provides identity management for individuals, products, and organizations. Security management services 102 performs functions such as Identity Management, User Registration, User Account Administration, Client Administration and Product Administration.

Access management services 104 is a set of components that enforce authentication and routing policies to web applications. Access management services 104 perform functions such as User Authentication, Federation Access, Session Management, URL/Resource Policy Enforcement, Routing and SSO to Applications, Web Services Access (SOAP), and Certificate Management.

Identity registry 106 is a register of the identity of individuals, products, and organizations, as well as information about those entities. Security management services 102 accesses identity registry 106 when verifying the identity of individuals, products, and organizations.

Directory services 108 stores, organizes, and provides access management services 104 with access to information typically managed by security management services 102, such as user accounts and organizational information. Directory services 108 allows the lookup of user accounts and organizational information as well as privileges and restrictions associated with the user account and organizational information.

Target applications 110 are computer programs designed to permit authenticated users to perform a group of coordinated functions, tasks, or activities. Access to target applications 110 is controlled by access management services 104, based on verifying the identity of the user.

As depicted, identity management system 100 includes access control services 112. Access control services 112 works in conjunction with access management services 104 to provide access to applications and data. According to an illustrative embodiment, access control services 112 provides a minimum level of access to applications and data for a minimum amount of time necessary to complete the requested service.

Figure 2:
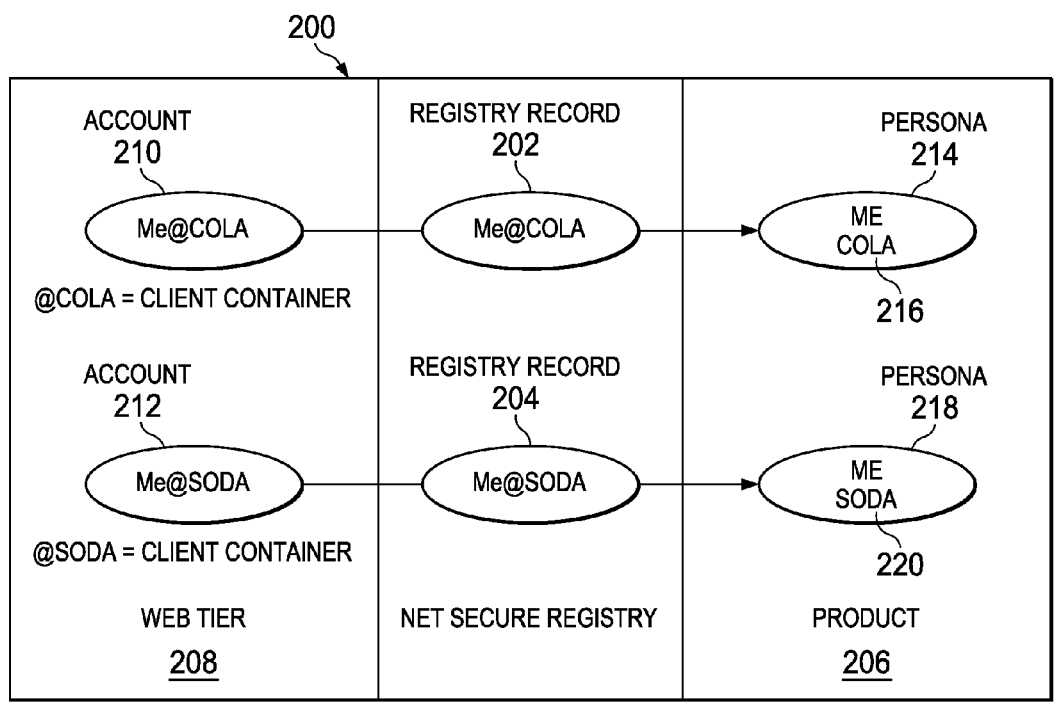
FIG. 2 is an illustration of an organizational diagram of a registry record within an identity registry depicted according to the prior art.

Referring now to FIG. 2, an organizational diagram of a registry record within an identity registry is depicted according to the prior art. Identity management system 200 is an example of an identity management system, such as identity management system 100 of FIG. 1, that uses a registry record organization scheme according to the prior art.

As depicted, identity management system 200 includes a database (not shown) having registry record 202 and registry record 204. The database can be, for example identity registry 106 of FIG. 1, using the registry record organization scheme described with reference to FIG. 2. Registry record 202 and registry record 204 are entries within the database.

As depicted, a client accesses product 206 from web tier 208 through one of account 210 and account 212. Product 206 is a target application, such as one of target applications 110 of FIG. 1. Web tier 208 is a collection of one more data processing systems that displays product information and personalized content for product 206 to the user. Upon verification of the user's identity, web tier 208 makes content of product 206 available to the user.

Account 210 is a user account that is specific to registry record 202. Registry record 202 points to persona 214 of the user, corresponding to a particular instance of product 206 executing a particular client container 216.

Client container 216 is a set of classes, libraries and other files required for execution of product 206 for a specific entity, which are bundled with the application client for execution. Access to the classes, libraries and other files of client container 216 is limited to authorized registry records, such as registry record 202, based on verification of account 210.

Account 212 is a user account that is specific to registry record 204. Registry record 204 points to persona 218 of the user, corresponding to a particular instance of product 206 executing a particular client container 220.

Client container 220 is a set of classes, libraries and ocher files required for execution of product 206 for a specific entity, which are bundled with the application client for execution. Access to the classes, libraries and other files of client container 220 is limited authorized registry records, such as registry record 204, based on verification of account 212.

Identity management system 200 therefore creates a separate registry record for each persona of the user, depending on the context of the user, as determined by the account which the user accesses identity management system 200.

The creation of separate registry records generally prevents identity management system 200 from unintentional disseminating unauthorized information between entities of different accounts, such as between a first employer and a second employer of the user.

For example, identity management system 200 maintains registry record 202 to create persona 214 for a user in the context of a first employer, for which product 206 is implemented using client container 216. Identity management system 200 maintains registry record 204 as a separate entity, distinct from registry record 202. Therefore, identity management system 200 maintains registry record 204 to create persona 218 for a user in the context of a second employer, for which product 206 is implemented using client container 220. Single-user can therefore exists as a plurality separate entities, each having a separate registry records, within identity management system 200, despite any redundancy of personal identifying information.

Figure 3:
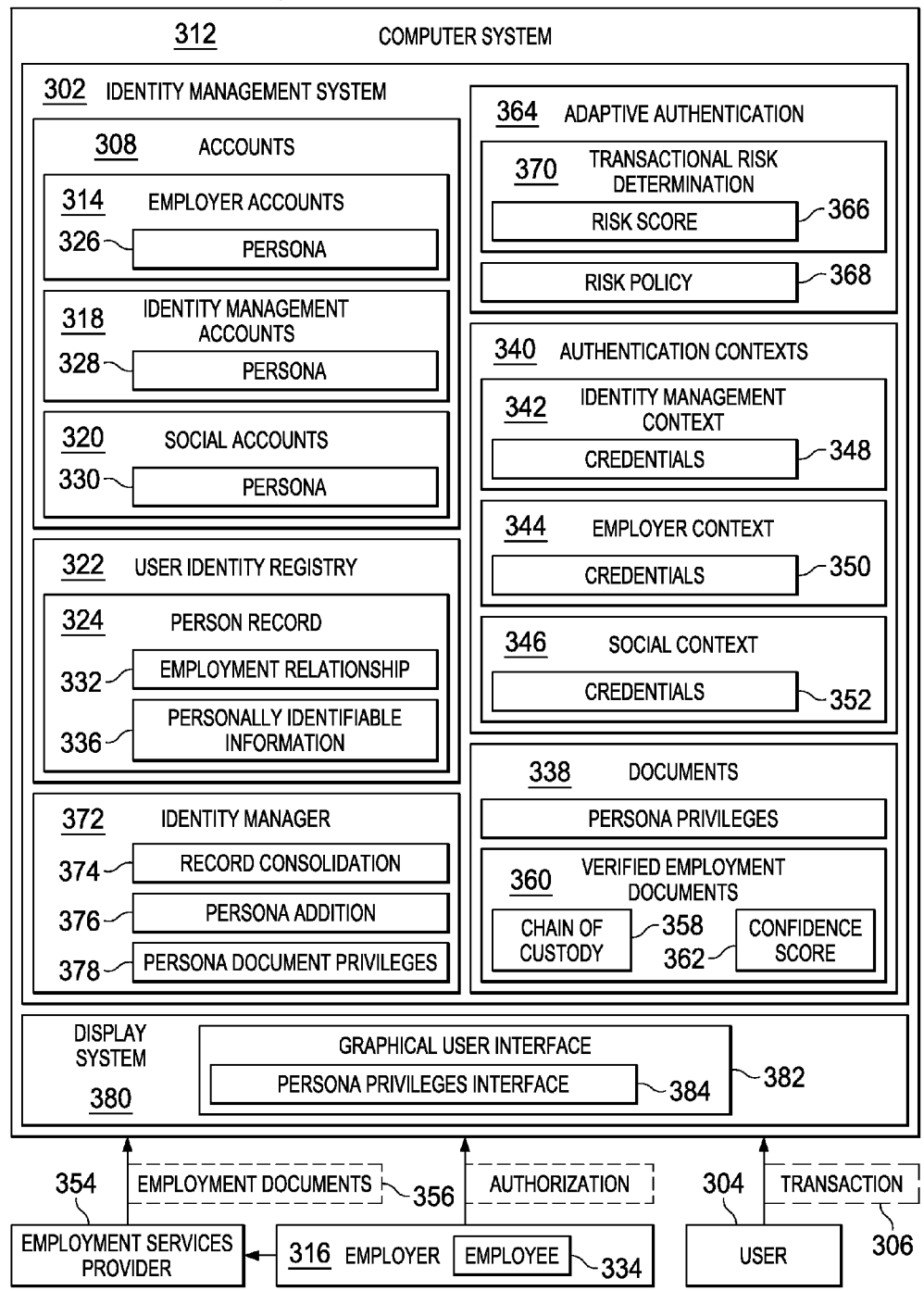
FIG. 3 is an illustration of a block diagram of a identity management environment depicted in accordance with an illustrative embodiment.

With reference now to FIG. 3, an illustration of a block diagram of an identity management environment is depicted in accordance with an illustrative embodiment.

Identity management environment 300 includes identity management system 302. Identity management system 302 is used to perform operations with respect to user 304. The operations can be, for example but not limited to, at least one of validation of an identity of the user 304, performing transactions 306 related to one or more accounts 308, and performing transactions 306 to manage the privileges of documents 310.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Identity management system 302 can be implemented in computer system 312, where the computer system is a hardware system includes one or more data processing systems. When more than one data processing system is present, those data processing systems may be in communication with each other using a communications medium. The communications medium may be a network. The data processing systems may be selected from at least one of a computer, a workstation, a server computer, a tablet computer, a laptop computer, a mobile phone, a personal digital assistant (PDA), or some other suitable data processing system.

Identity management system 302 includes accounts 308. Employer accounts 314 are ones of accounts 308 that are maintained by identity management system 302 for the benefit of employer 316. Employer account 314 includes persona 326 of user 304. Persona 326 is a representation of user 304 in the context of employer account 314. Persona 326 includes any granularly designated information by user 304, such at least one of person record 324, including employment relationship 332 and personally identifiable information 336, and documents 338.

Identity management accounts 318 are ones of accounts 308 that are maintained by identity management system 302 for the benefit of user 304, and do not include a context of employer 316. Identity management account 318 includes persona 328 of user 304. Persona 328 is a representation of user 304 in the context of identity management account 318. Persona 328 includes any granularly designated information by user 304, such at least one of person record 324, including employment relationship 332 and personally identifiable information 336, and documents 338.

Social accounts 320 are ones of accounts 308 that are maintained by a social media provider for the benefit of user 304. Social account 320 includes persona 330 of user 304. Persona 330 is a representation of user 304 in the context of social account 320. Persona 330 includes any granularly designated information by user 304, such at least one of person record 324, including employment relationship 332 and personally identifiable information 336, and documents 338.

Identity management system 302 includes user identity registry 322. User identity registry 322 is a register of users, such as user 304, that can access identity management system 302.

Identity management system 302 maintains person record 324 in user identity registry 322. Person record 324 is an entry of user 304 within user identity registry 322 that is not exclusively associated with a particular employer, such as employer 316, or a particular client container, such as one of client container 216 or client container 220 of FIG. 2. By removing the context of employer 316 from person record 324, identity management system 302 enables the capacity for user 304 to consolidate multiple personae, such as persona 326, persona 328, and persona 330, from different ones of accounts 308 into a single entry of person record 324 within user identity registry 322.

Person record 324 includes employment relationship 332. employment relationship 332 is an interrelation, interconnection, or association between user 304, as identified within person record 324, and employer 316. Employment relationship 332 denotes certain conditions under which user 304 performs, has performed, or is willing to perform work or services for employer 316. Employment relationship 332 can exist when user 304 is a current or former one of employee 334 of employer 316. Employment relationship 332 can exist when user 304 applies to be employee 334 of employer 316.

Person record 324 includes personally identifiable information 336. Personally identifiable information 336 is information that can be used on its own or with other information to identify, contact, or locate user 304.

Identity management system 302 authenticates the identity of user 304 in one or more of the authentication contexts 340. Authentication contexts 340 are the different circumstances and environments under which identity management system 302 verifies the identity of user 304. For example, identity management system 302 may verify the identity of user 304 in at least one of identity management context 342, employer context 344, and social context 346.

Identity management context 342 is one of authentication contexts 340 that is associated with identity management account 318. Identity management context 342 can be provided by a context from identity management account 318. Identity management context 342 includes credentials 348. Credentials 348 are at least one of attestations, assurances, veracities or validations of identity of user 304 that are required by identity management system 302 to validate the identity of user 304 in identity management context 342.

Employer context 344 is one of authentication contexts 340 that is associated with employer account 314. Employer context 344 can be provided by a context from employer account 314. Employer context 344 includes credentials 350. Credentials 350 are at least one of attestations, assurances, veracities or validations of identity of user 304 that are required by identity management system 302 to validate the identity of user 304 in employer context 344.

Social context 346 is one of authentication contexts 340 that is associated with social account 320. Social context 346 can be provided by a context from social account 320. Social context 346 includes credentials 352. Credentials 352 are at least one of attestations, assurances, veracities or validations of identity of user 304 that are required by identity management system 302 to validate the identity of user 304 in social context 346

By allowing for authentication of user 304 within social context 346, identity management system 302 allows for many mundane account administrative tasks, such as recovery of a lost password, password reset requests, and password policy, to be automated and off loaded to the social identity provider. Furthermore, the social identity providers are often better equipped to provide aid to user 304 with these mundane account administrative tasks than would be employer 316 or employment services provider 354.

Employment services provider 354 performs operations with respect to employer 316. The operations can be, for example but not limited to, providing payroll management services for employer 316. Payroll management services can include, for example but not limited to, accounting services provided by employment services provider 354 to employer 316 that tracks amounts paid to employees for services they provided during a certain period of time. As part of providing payroll management services, employment services provider 354 can store employment documents 356 in identity management system 302.

In an illustrative embodiment, employment services provider 354 generates employment documents 356 related to persona 326. Employment documents 356 can include, for example, at least one of a W-4 document of employee 334, an E-I9 document of employee 334, a W-2 document of employee 334, a Pay Statement document of employee 334. Additionally, employment document 356 can include, for example, at least one of certifications earned by employee 334 during employment with employer 316, training courses completed by employee 334 during employment with employer 316, employment evaluations of employee 334 by employer 316, and any other documents generated with regard to user 304 in his role as employee 334 of employer 316.

Identity management system 302 stores employment documents 356 as documents 338. In an illustrative embodiment, employment documents 356 are submitted to identity management system 302 directly from employment services provider 354, thereby creating chain of custody 358. Chain of custody 358 is a chronological documentation showing the custody, control, transfer, dissemination, and disposition of employment documents 356. Verified employment documents 360 are ones of documents 338 having chain of custody 358 that includes only trusted entities, such as employer 316 and employment services provider 354, prior to receipt of employment document 356 by identity management system 302.

Identity management system 302 also allows for direct submission of documents by third-party, through API, or by direct upload from user 304. Identity management system 302 also stores these directly submitted documents as documents 338. However, these documents would not have the same assertion of authenticity as documents acquired having chain of custody 358. Identity management system 302 does not store documents lacking chain of custody 362 as verified employment documents 360.

In an illustrative embodiment, chain of custody 358 can be reflected in confidence score 362. Confidence score 362 is a quantified score related to the veracity of each of documents 338. Verified employment documents 360 that are received into identity management system 302 by way of a verified chain of custody 358 may have a higher confidence score 362 associated with the document. Documents 338 that are not received into identity management system 302 by way of a verified chain of custody 358 may have a lower confidence score 362 associated with the document. Similarly, the confidence score can be adjusted based on at least one of the number of entities and identity of entities having custody or control of the submitted document.

Identity management system 302 includes adaptive authentication 364. Adaptive authentication 364 is an authentication and fraud detection platform for authenticating the identity of user 304 in response to transaction 306 submitted within a particular one of authentication context 340. Adaptive authentication 364 is a risk-based, multifactor authentication. Using a risk and rules based approach, Adaptive authentication 364 may require additional identity assurance for particular transaction, such as at least one of transaction 306 that have a high risk score 366, transaction 306 violate risk policy 368, and combinations thereof.

Adaptive authentication 364 includes transactional risk determination 370. Transactional risk determination 370 is a self-learning statistical evaluation of the risk of transaction 306. In an illustrative embodiment, transactional risk determination 370 generates risk score 366 for each transaction 306 performed by user 304. In an illustrative embodiment, risk score 366 can be a numeric score within a predefined range, where higher scores indicate a greater level of risk. In an illustrative embodiment, transactional risk determination 370 determines risk score 366 according to at least one of device profiling, behavioral profiling, and data within a repository of known fraud patterns.

Adaptive authentication 364 includes risk policy 368. Risk policy 368 is at least one rules, laws and practices that outlines access and authentication restrictions for transaction 306. Adaptive authentication 364 translates risk policy 368 into decisions and actions through the use of a comprehensive rules framework. The illustrative embodiment, Adaptive authentication 364 can be used to set risk score 366 that will require later review, prompt additional assurance or "Step-up" Authentication from user 304. Additionally, adaptive authentication 364 may deny transaction 306 where the likelihood of fraud is very high. In an illustrative embodiment, Adaptive authentication 364 create risk policy 368 independently of risk score 366 as determined by transactional risk determination 370, such as blocking authentication from a specific IP address.

Identity management system 302 includes identity manager 372. Identity manager 372 enables the granular management of at least one of person record 324 and documents 338 by user 304.

Identity manager 372 may be implemented in software, hardware, firmware or a combination thereof. When software is used, the operations performed by identity manager 372 may be implemented in program code configured to run on hardware, such as a processor unit. When firmware is used, the operations performed by identity manager 372 may be implemented in program code and data and stored in persistent memory to run on a processor unit. When hardware is employed, the hardware may include circuits that operate to perform the operations in identity manager 372.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In an illustrative embodiment, identity manager 372 includes record consolidation 374. Record consolidation 374 is a process that identifies duplicate or related records within user identity registry 322, and allows user 304 to consolidate the records into a single one of person record 324.

In an illustrative embodiment, identity manager 372 includes persona addition 376. Persona addition 376 is a process that identifies additional personae of user 304. Therefore, persona addition 376 and allows user 304 to create an additional authentication context 340, using the identified additional persona of the user 304 in the context of an identified account.

Identity manager 372 includes persona document privileges 378. Persona document privileges 378 is a selectable control that provides user 304 with granular control of the presentation of documents 338 to persona 326 of employer 316, persona 328 of identity management account 318, and persona 330 of social account 320.

As depicted, identity management environment 300 includes display system 380. In this illustrative example, display system 380 can be a group of display devices. A display device in display system 380 may be selected from one of a liquid crystal display (LCD), a light emitting diode (LED) display, an organic light emitting diode (OLED) display, and other suitable types of display devices.

In this illustrative example, display system 380 includes graphical user interface 382. In this illustrative example, identity management system 302 can display information such as for example, at least one of persona document privileges 378 or other suitable information in graphical user interface 382.

Identity management system 302 may receive user input selecting the displayed information in graphical user interface 382. Identity management system 302 may also receive user input through graphical user interface 382 to selectively publish the various documents 338 to different ones of persona 326, persona 328, and persona 330, regardless of the context in which the documents were received.

In an illustrative example, graphical user interface 382 includes persona privileges interface 384. Persona privileges interface 384 is an interface that allows user 304 to interact with identity manager 372, setting persona document privileges 378 for documents 338. Persona privileges interface 384 therefore enables user 304 to selectively publish the various documents 338 to different ones of persona 326, persona 328, and persona 330, regardless of the context in which the documents were received.

As a result, computer system 312 operates as a special purpose computer system in which identity manager 372 in computer system 312 enables user 304 to selectively publish the various documents 338 to different ones of persona 326, persona 328, and persona 330, regardless of the context in which the documents were received.

Identity manager 372 enables a granular control for selectively publishing various documents 338 to different ones of persona 326, persona 328, and persona 330, regardless of the context in which the documents were received. Thus, identity manager 372 transforms computer system 312 into a special purpose computer system as compared to currently available general computer systems that do not have identity manager 372.

The illustration of identity management system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
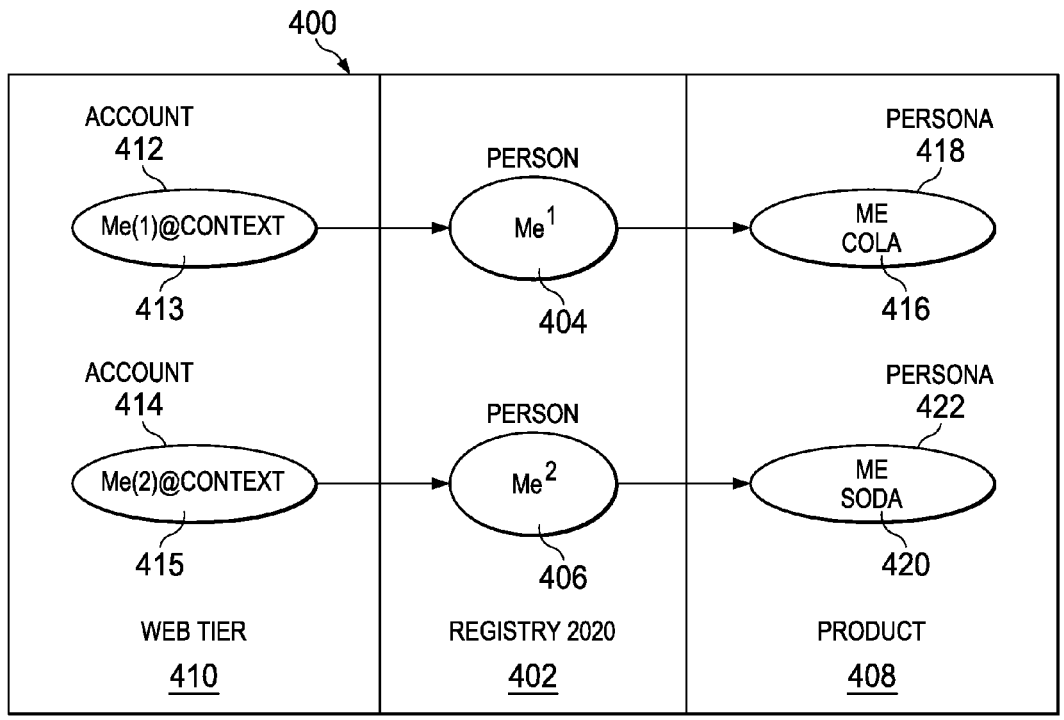
FIG. 4 is an illustration of an organizational diagram of a registry record within an identity registry depicted as according to an illustrative embodiment.

With reference now to FIG. 4, an organizational diagram of a registry record within an identity registry is shown according to an illustrative embodiment. Identity management system 400 is an example of an identity management system 302 of FIG. 3.

As depicted, identity management system 400 includes a database (not shown) having person record 402. Person record 402 is an example of person record 324 of FIG. 3. Person record 402 includes employment relationship 404 and employment relationship 406. The database can be, for example identity registry 106 of FIG. 1. Person record 402 is an entry within the database having a set of one or more employment relationships.

Identity management system 400 introduces the concept of a natural person by removing the employer context from person record 402 of identity management system 400. Web tier 410 includes account 412 and account 414. Each of account 412 and account 414 is presented in the context of an employer. However, rather than maintain a separate registry entry for each of account 412 and 414, identity management system 400 distinguishes between persona 418 and persona 422 based on which of authentication context 413 and authentication context 415 is used to access identity management system 400, as well direct indication of a persona from the user.

As depicted, a user accesses product 408 from web tier 410 through one of account 412 and account 414. Product 408 is a target application, such as one of target applications 110 of FIG. 1. Web tier 410 is a collection of one more data processing systems that displays product information and personalized content for product 408 to the user. Web tier 410 makes content of product 408 available to the user.

Account 412 is a user account that is associated with, but not the specific to, person record 402. However, account 412 is specific to a particular instance of product 408, requiring the execution of client container 416. Based on account 412 providing a context for product 408, identity manager 372 of FIG. 3 points person record 402 to a particular instance of product 408 executing in client container 416. Identity management system 400 authenticates a user within authentication context 413, allowing the user to then access product 408 in the user's context of persona 418, corresponding to account 412.

Client container 416 is a set of classes, libraries and other files required for execution of product 408 for a specific entity, such as employer 316 of FIG. 3, which is bundled with the application client for execution. Access to the classes, libraries and other files of client container 416 is limited by identity manager 372 based on account 412 providing a context for the specific instance of product 408.

Account 414 is a user account that is associated with, but not the specific to, person record 402. However, account 414 is specific to a particular instance of product 408, requiring the execution of client container 420. Based on account 414 providing a context for product 408, identity manager 372 points person record 402 to the particular instance of product 408 executing in client container 420. Identity management system 400 authenticates a user within authentication context 415, allowing the user to then access product 408 in the user's context of persona 418, corresponding to account 414.

Client container 420 is a set of classes, libraries and other files required for execution of product 408 for a specific entity, such as employer 316 of FIG. 3, which is bundled with the application client for execution. Access to the classes, libraries and other files of client container 420 is limited by identity manager 372 based on account 414 providing a context for a specific instance of product 408.

Identity management system 400 therefore creates a single person record 402 for the user. However, identity manager 372 provides access to different instances of product 408 depending on the context provided by the accessing account, such as account 412 or account 414. Based on the context provided by the accessing account, identity manager 372 authorizes access to various classes, libraries and other files required by the different product instances executing within client container 416 and client container 420. Identity manager 372 therefore prevents the unintentional dissemination of information between entities, such as the first employer and the second employer.

For example, identity management system 400 maintains person record 402 to create persona 418 for a user in the context of a first employer, for which product 408 is implemented using client container 416. Identity manager 372 enables Identity management system 400 to maintain the same person record 402 to create persona 422 for a user in the context of a second employer, for which product 408 is implemented using client container 420. Therefore, identity manager 372 enables identity management system 400 to maintain a single person record 402 to implement both persona 418 and persona 422, eliminating redundancy of personal identifying information of the user.

Figure 5:
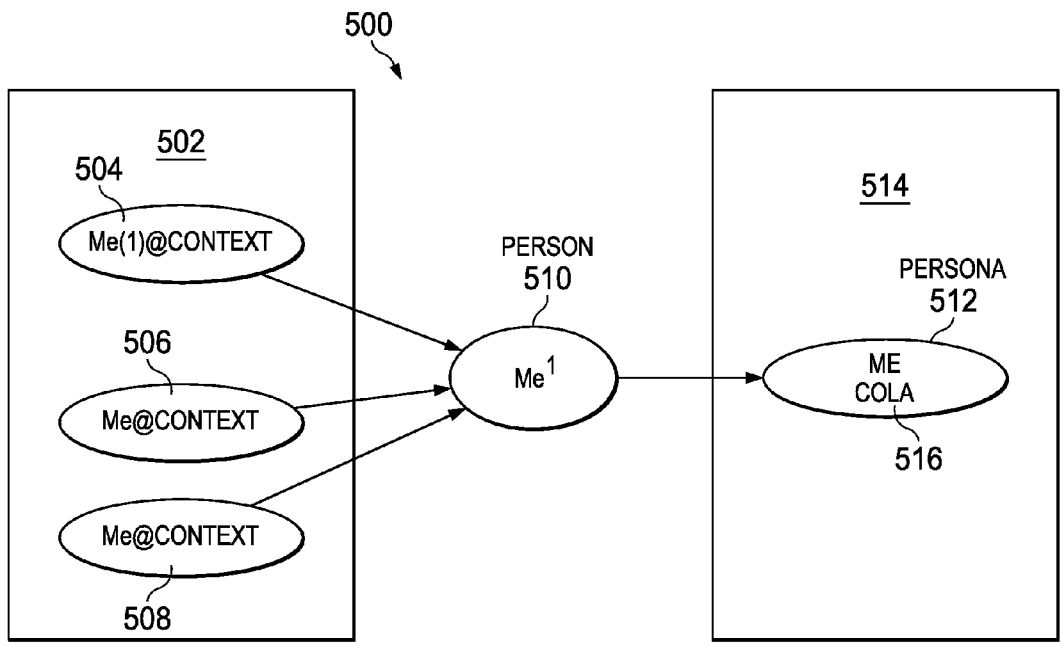
FIG. 5 is an illustration of diagram of accessing a product instance through one of a plurality of context depicted according to an illustrative embodiment.

With reference now to FIG. 5, an illustration of diagram of accessing a product instance through one of a plurality of context is shown according to an illustrative embodiment.

As depicted, web tier 502 includes authentication context 504, authentication context 506, and authentication context 508. Each of authentication context 504, authentication context 506, and authentication context 508 is one of authentication context 340 of FIG. 3, and provides an context by which identity management system 500 authenticates the identity of a user, such as user 304 of FIG. 3. Once authenticated, the user can then perform various actions with respect to persona 512 for which product 514 is implemented using client container 516.

As depicted, authentication context 504 is an identity management context, such as identity management context 342 of FIG. 3, and is specific to identity management system 500. Authentication context 504 includes credentials, such as credentials 348 of FIG. 3, that provide at least one of attestations, assurances, veracities or validations of identity of user 304 that are required to access identity management system 500 from authentication context 504.

As depicted, persona 512 is persona 326 of FIG. 3. However, persona 512 can be any persona provided by a particular authentication context, such as persona 326, persona 328, and persona 330 of FIG. 3. Persona 512 is a representation of a user, such as user 304, in the context of an employer, such as employer 316. Persona 512 includes any granularly designated information by user 304, such at least one of person record 324, including employment relationship 332 and personally identifiable information 336, and documents 338.

As depicted, authentication context 506 and authentication context 508 is a social context, such as social context 346 of FIG. 3. Authentication context 506 is specific to a first social media profile of user 304, maintained by a first social media provider. Authentication context 508 is specific to a second social media profile of user 304, maintained by a second social media provider.

Authentication context 506 and authentication context 508 includes credentials, such as credentials of FIG. 3, that provide at least one of attestations, assurances, veracities or validations of identity of user 304 that are required to access identity management system 500 from authentication context 504. The credentials of authentication context 506 may be the same or different from the credentials of authentication context 508. Furthermore, the credentials of authentication context 506 and authentication context 508 may be the same or different from the credentials of context 504.

By allowing for authentication of user 304 within Authentication context 506 and authentication context 508, identity management system 500 allows for many mundane account administrative tasks to be automated and off loaded to the social identity provider. However, because a social media provider may not require as stringent attestations, assurances, veracities or validations of identity of user 304, transaction 306 performed by user 304 using Authentication context 506 and authentication context 508 may have a higher associated transactional risk than would a similar action using authentication context 504.

Identity management system 500 includes an adaptive authentication, such as adaptive authentication 364 of FIG. 3. Adaptive authentication 364 is an authentication and fraud detection platform for authenticating the identity of user 304 in response to transaction, such as transaction 306 of FIG. 3. Adaptive authentication 364 is a risk-based, multifactor authentication that may account for the authentication context in which the user requests a transaction. Using a risk and rules based approach, Adaptive authentication 364 may require additional identity assurance for transaction 306, based on which of authentication context 504, authentication context 506, or authentication context 508 is used by identity management system 500 when the user requests the transaction.

Figure 6:
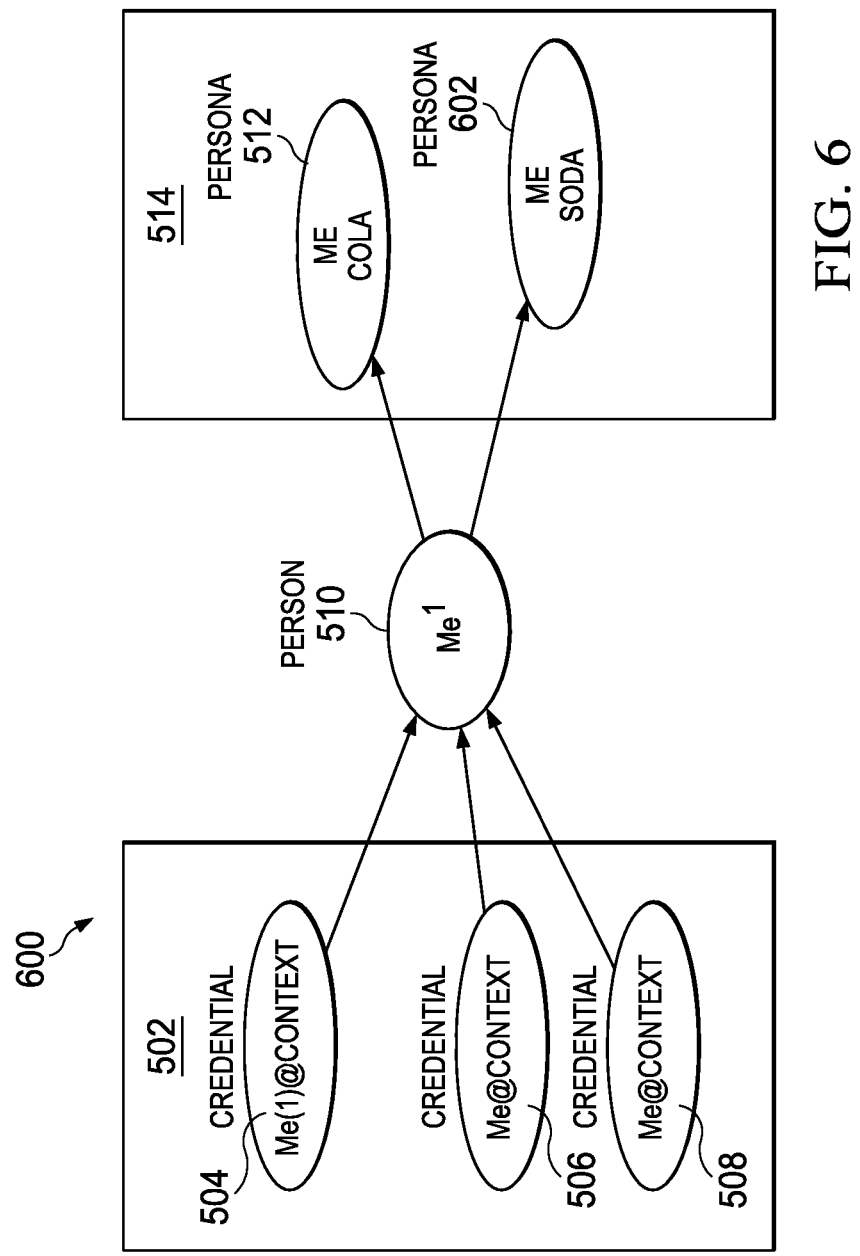
FIG. 6 is an illustration of a diagram of accessing multiple product instance through one of a plurality of context depicted according to an illustrative embodiment.

With reference now to FIG. 6, an illustration of a diagram of accessing multiple product instance through one of a plurality of context is shown according to an illustrative embodiment.

As depicted, web tier 502 includes authentication context 504, authentication context 506, and authentication context 508. Each of authentication context 504, authentication context 506, and authentication context 508 is one of authentication context 340 of FIG. 3, and provides an context by which a user, such as user 304 of FIG. 3 can access person record 510 of identity management system 500. When accessing person record 510, the user can then perform various actions with respect to persona 512 and persona 602, depending on which of authentication context 504, authentication context 506, and authentication context 508 is used to access identity management system 600.

Identity management system 600 includes in identity manager, such as identity manager 372. Identity manager 372 enables the granular management of at least one of person record 324 and documents 338 by user 304.

With reference now to FIG. 7, an illustration of a persona privileges interface shown within a graphical user interface showing default privileges for documents is depicted in accordance with an illustrative embodiment. Persona privileges interface 700 is an example of persona privileges interface 384 of FIG. 3.

As depicted, interface 700 displays context 702, context 704, context 706, and context 708. Each of context 702, context 704, context 706, and context 708 is a depiction of an authentication context, such as authentication context 340 of FIG. 3.

As depicted, interface 700 displays persona 710, persona 712, persona 714, and persona 716. Persona 710 is a representation of a user, such as user 304 of FIG. 3, within context 702. Persona 712 is a representation of the user within context 704. Persona 714 is a representation of the user within context 706. Persona 716 is a representation of user within context 708.

As depicted, interface 700 displays document 718, document 720, document 722, document 724, document 726, document 728, document 730, and documents 732. Document 718 and document 720 are indications of documents submitted within context 702. Document 722 and document 724 are indications of documents submitted within context 704. Document 726 and document 728 are indications of documents submitted within context 706. Document 730 and document 732 are indications of documents submitted within context 708.

As depicted, persona 710 is granted document privileges to both document 718 and document 720. In an illustrative embodiment, persona 710 is granted, by default, document privileges to all documents submitted within context 702.

As depicted, persona 712 is granted document privileges to both document 722 and document 724. In an illustrative embodiment, persona 712 is granted, by default, document privileges to all documents submitted within context 704.

As depicted, persona 714 is granted document privileges to both document 726 and document 728. In an illustrative embodiment, persona 714 is granted, by default, document privileges to all documents submitted within context 706.

As depicted, persona 716 is granted document privileges to both document 730 and document 732. In an illustrative embodiment, persona 716 is granted, by default, document privileges to all documents submitted within context 708.

Identity manager 372 of FIG. 3 enables the granular management of document 718, document 720, document 722, document 724, document 726, document 728, document 730, and documents 732. Through interaction with persona privileges interface 700, a user can granularly designate document privileges to any of persona 710, persona 712, persona 714, and persona 716 for access to any of document 718, document 720, document 722, document 724, document 726, document 728, document 730, and documents 732, regardless of the context in which the document originates.

With reference now to FIG. 8, an illustration of a persona privileges interface shown within a graphical user interface showing user modified privileges for documents is depicted in accordance with an illustrative embodiment. Persona privileges interface 800 is persona privileges interface 700 of FIG. 3, after receiving interactions from a user, such as user 304 of FIG. 3 modifying document privileges, such as persona document privileges 378 of FIG. 3.

As depicted, persona 710 is granted document privileges to both document 718 and document 720. In an illustrative embodiment, persona 710 is granted, by default, document privileges to all documents submitted within context 702. Through a user interaction with persona privileges interface 800, such as transaction 306 of FIG. 3, the user has granted persona 710 additional document privileges to both document 726 and document 728. Document 726 and document 728 are therefore made available to persona 710.

As depicted, persona 712 is granted document privileges to both document 722 and document 724. In an illustrative embodiment, persona 712 is granted, by default, document privileges to all documents submitted within context 704. Through a user interaction with persona privileges interface 800, such as transaction 306 of FIG. 3, the user has granted persona 712 additional document privileges to both document 718 and document 720. Document 718 and document 720 are therefore made available to persona 712.

As depicted, persona 714 is granted document privileges to both document 726 and document 728. In an illustrative embodiment, persona 714 is granted, by default, document privileges to all documents submitted within context 706. Through a user interaction with persona privileges interface 800, such as transaction 306 of FIG. 3, the user has granted persona 714 additional document privileges to both document 718 and document 720. Document 718 and document 720 are therefore made available to persona 714.

As depicted, persona 716 is granted document privileges to both document 730 and document 732. In an illustrative embodiment, persona 716 is granted, by default, document privileges to all documents submitted within context 708. Through a user interaction with persona privileges interface 800, such as transaction 306 of FIG. 3, the user has granted persona 716 additional document privileges to document 718, document 720, document 722, document 724, document 726, and document 728. Document 718, document 720, document 722, document 724, document 726, and document 728 are therefore made available to persona 716.

Through interaction with persona privileges interface 800, identity manager 372 enables granular management of each of document 718, document 720, document 722, document 724, document 726, document 728, document 730, and documents 732, regardless of the context in which the document originates.

Figure 9:
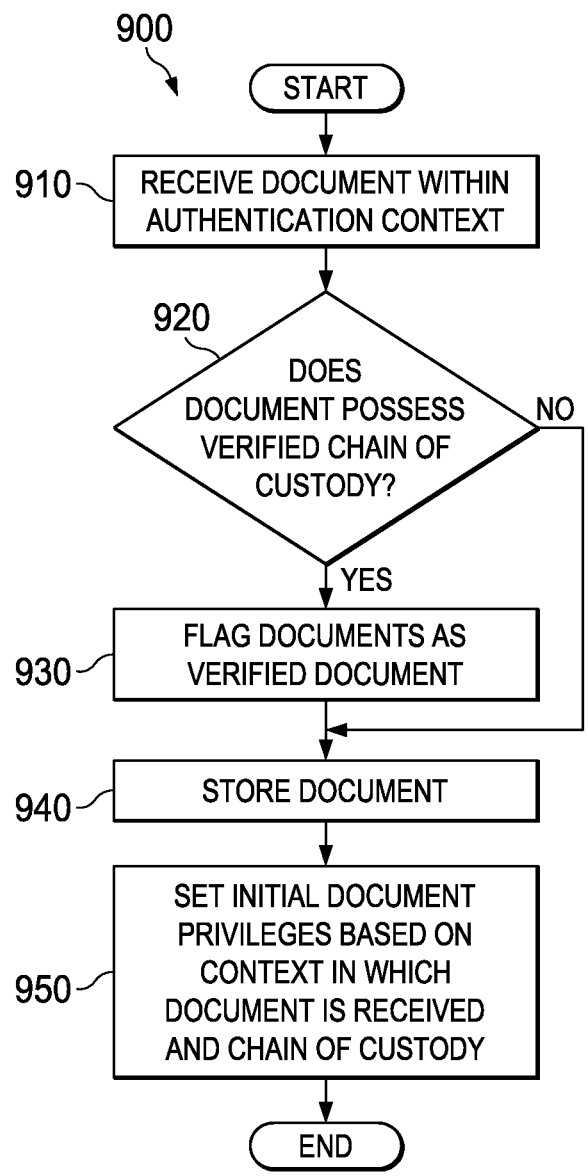
FIG. 9 is an illustration of a flowchart for storing a document within identity management system depicted according to an illustrative embodiment.

With reference now to FIG. 9, an illustration of a flowchart for storing a document within identity management system is shown according to an illustrative embodiment.

Process 900 begins by receiving a document within an authentication context (step 910).

Responsive to receiving the document, process 900 determines whether the document possesses a verified chain of custody (step 920).

Responsive to determining that the document possesses a verified chain of custody ("yes" at step 920), process 900 flags the document as a verified document (step 930).

Process 900 stores the document (step 940).

Process 900 sets initial document privileges based on the context in which the document is received and any chain of custody for the document (step 950), with the process terminating thereafter.

Figure 10:
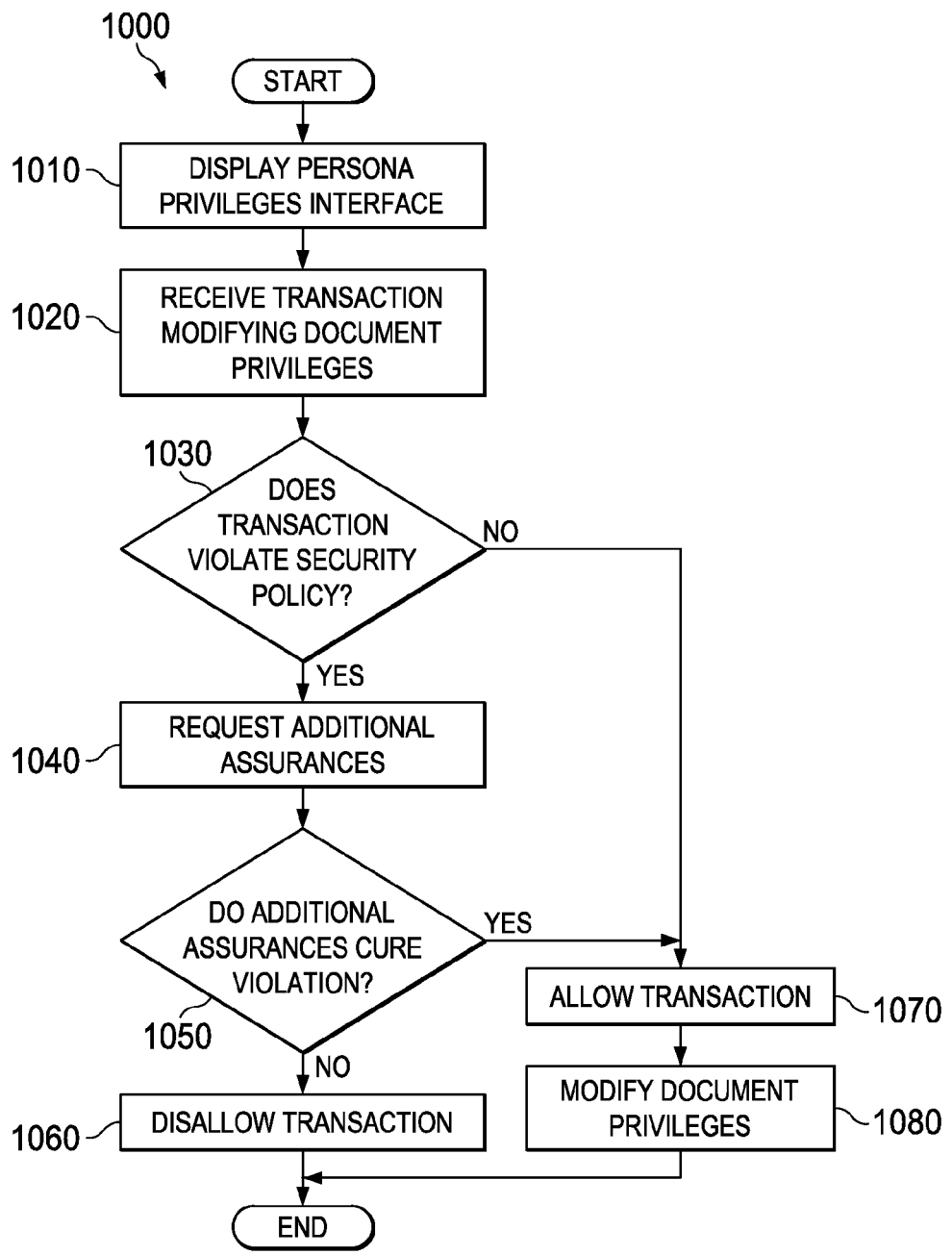
FIG. 10 is an illustration of a flowchart for modifying document privileges of a persona within an identity management system depicted according to an illustrative embodiment.

With reference now to FIG. 10, an illustration of a flowchart for modifying document privileges of a persona within an identity management system is shown according to an illustrative embodiment.

Process 1000 begins by displaying persona privileges interface (step 1010).

Process 1000 receives a transaction requesting modification to document privileges (step 1020).

Responsive to receiving transaction, process 1000 determines whether the transaction violates a security policy for validation of the user (step 1030).

Responsive to determining the transaction violates the security policy ("yes" at step 1030), process 1000 can request additional assurances to validate the user (step 1040).

Responsive to receiving any additional assurances, process 1000 determines whether the additional assurances cure the violation of the security policy for validation of the user (step 1050).

Responsive to determining that the additional assurances cannot cure the violation ("no" at step 1050), process 1000 disallows the transaction (step 1060), with the process terminating thereafter.

Responsive to determining that the additional assurances can cure the violation ("yes" at step 1050), process 1000 allows the transaction (step 1070). Process 1000 then modifies document privileges (step 1080), with the process terminating thereafter.

Returning now to step 1030, responsive to determining that the transaction does not violate security policy ("no" at step 1030), process 1000 allows the transaction (step 1070). Process 1000 then modifies document privileges (step 1080), with the process terminating thereafter.

In this manner, the publication and validation of employment documents within the plurality of online profiles can be made more easily as compared to currently used techniques. Because documents are submitted to the identity management system having a chain of custody, the veracity of the document is more trustworthy. Furthermore, by providing a granular control of document publication to the various online profiles, a user can more easily control publication of documents to the various profiles, regardless of the context in which the document is submitted to the identity management system. These and other tasks may be performed using the visualization of persona document privileges that are manipulated in interactions within a graphical user interface to generate a result. As result, a user may more efficiently manage their various online personas and identities based on the visualization of the persona document privileges in a graphical user interface.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
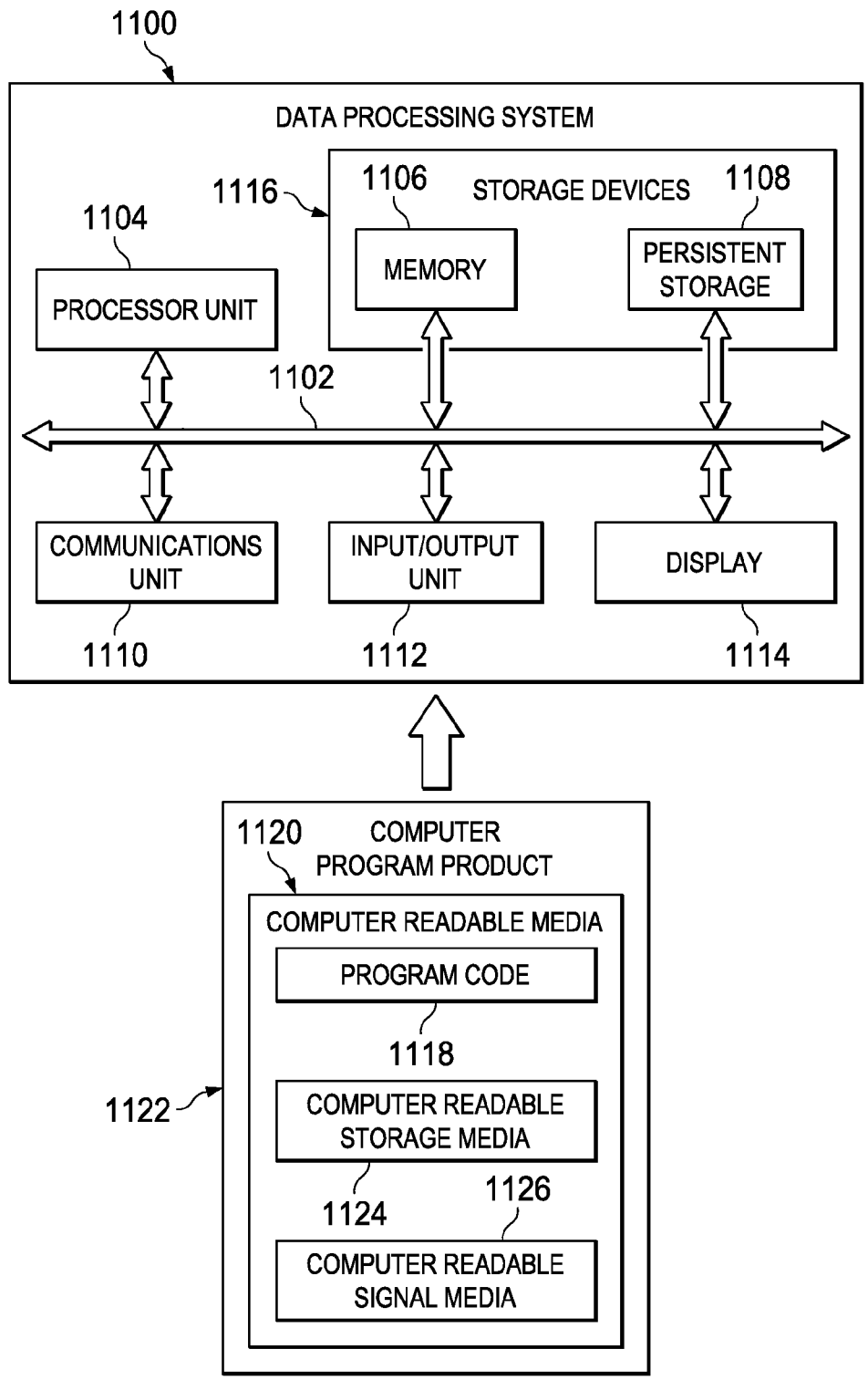
FIG. 11 is an illustration of a block diagram of a data processing system depicted in accordance with an illustrative embodiment.

Turning now to FIG. 11, an illustration of a block diagram of a data processing system is depicted in accordance with an illustrative embodiment. Data processing system 1100 may be used to implement one or more data processing systems in identity management system 302 in FIG. 3. In this illustrative example, data processing system 1100 includes communications framework 1102, which provides communications between processor unit 1104, memory 1106, persistent storage 1108, communications unit 1110, input/output unit 1112, and display 1114. In this example, communication framework may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, the illustrative embodiments provide a method and apparatus for managing identities have a user. In one illustrative example, a computer system comprises a identity management system for managing documents within an identity management system. The identity management system receives a document. The document is received within an authentication context of a user. The identity management system determines a chain of custody for the document. The identity management system stores the document. The identity management system sets document privileges for the document based on the authentication context in the chain of custody.

In this manner, the publication and validation of employment documents within the plurality of online profiles can be made more easily as compared to currently used techniques. Because documents are submitted to the identity management system having a chain of custody, the veracity of the document is more trustworthy. Furthermore, by providing a granular control of document publication to the various online profiles, a user can more easily control publication of documents to the various profiles, regardless of the context in which the document is submitted to the identity management system. These and other tasks may be performed using the visualization of persona document privileges that are manipulated in interactions within a graphical user interface to generate a result. As result, a user may more efficiently manage their various online personas and identities based on the visualization of the persona document privileges in a graphical user interface.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. In particular, word cloud generator is configured to perform the different operations described as well as other operations using at least one of program code, hardware, firmware, or other suitable components.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing documents within an identity management system, the method comprising:
   receiving, by a computer system, a document, the document being received within an authentication context of a user;
   determining, by the computer system, a chain of custody for the document;
   in response to determining that the chain of custody is a verified chain of custody, storing, by the computer system, the document as a verified document with a quantified confidence score; and
   setting, by the computer system, document privileges for the document based on both the authentication context and the confidence score of the chain of custody.

2. The method of claim 1, further comprising:
   receiving, by the computer system, a transaction requesting modification to the document privileges;
   determining, by the computer system, whether the transaction violates a security policy for validation of the user within the authentication context; and
   responsive to determining that the transaction does not violate the security policy, modifying, by the computer system, the document privileges for the document based on the transaction.

3. The method of claim 2, further comprising:
   responsive to determining that the transaction violates the security policy, requesting, by the computer system, additional assurances of an identity of the user for validation of the user;
   responsive to receiving the additional assurances of the identity, determining, by the computer system, whether the additional assurances cure the violation of the security policy; and
   responsive to determining that the additional assurances cure the violation of the security policy, modifying, by the computer system, the document privileges for the document based on the transaction.

4. The method of claim 3, further comprising:
receiving the additional assurances from the user, wherein the additional assurances comprise credentials to validate the user within a second authentication context; and
wherein the step of determining whether the additional assurances cure the violation of the security policy further comprises:
determining, by the computer system, whether the transaction violates a security policy for validation of the user within the second authentication context.

5. The method of claim 4, wherein the authentication context is associated with a first account of the user, the first account including credentials to authenticate the user within the authentication context; and
wherein the second authentication context is associated with a second account of the user, the second account including second credentials to authenticate the user within the second authentication context.

6. The method of claim 5, wherein the account is selected from an identity management account of the user, an employer account of the user, and a social account of the user.

7. The method of claim 2, wherein the step of receiving the document further comprises:
receiving the document from an employment services provider, wherein the authentication context is associated with an identity management account of the user with the employment services provider.

8. The method of claim 7, wherein the document privileges comprise a number of accounts of the user to which the document is published, wherein the document privileges are granularly selectable by the user, the method further comprising:
receiving, by the computer system, a transaction requesting modification to the document privileges, wherein the modification is a selection of at least one additional account of the user;
responsive to determining that the transaction does not violate a security policy, modifying, by the computer system, the document privileges for the document to include the at least one additional account of the user; and
publishing, by the computer system, the document to the at least one additional account.

9. A computer system comprising:
a display system;
at least one hardware processor; and
an identity management system in communication with the display system and hardware processor, wherein the identity management system receives a document, the document being received within an authentication context of a user; determines a chain of custody for the document; stores the document as a verified document with a quantified confidence score in response to determining that the chain of custody is a verified chain of custody; and sets document privileges for the document based on both the authentication context and the confidence score of the chain of custody.

10. The computer system of claim 9, wherein the identity management system:
receives a transaction requesting modification to the document privileges;
determines whether the transaction violates a security policy for validation of the user within the authentication context; and
modifies the document privileges for the document based on the transaction in response to determining that the transaction does not violate the security policy.

11. The computer system of claim 10, wherein the identity management system:
requests additional assurances for validation of the user in response to determining that the transaction violates the security policy;
determines whether the additional assurances cure the violation of the security policy in response to receiving the additional assurances; and
modifies the document privileges for the document based on the transaction in response to determining that the additional assurances cure the violation of the security policy.

12. The computer system of claim 11, wherein the identity management system:
receiving the additional assurances from the user, wherein the additional assurances comprise credentials to validate the user within a second authentication context; and
wherein in determining whether the additional assurances cure the violation of the security policy, the identity management system:
determines whether the transaction violates a security policy for validation of the user within the second authentication context.

13. The computer system of claim 12, wherein the authentication context is associated with a first account of the user, the first account including credentials to authenticate the user within the authentication context; and
wherein the second authentication context is associated with a second account of the user, the second account including second credentials to authenticate the user within the second authentication context.

14. The computer system of claim 13, wherein the account is selected from an identity management account of the user, an employer account of the user, and a social account of the user.

15. The computer system of claim 9, wherein in receiving the document further comprises the identity management system:
receives the document from an employment services provider, wherein the authentication context is associated with an identity management account of the user with the employment services provider.

16. The computer system of claim 15, wherein the document privileges comprise a number of accounts of the user to which the document is published, wherein the document privileges are granularly selectable by the user, and wherein the identity management system:
receives a transaction requesting modification to the document privileges, wherein the modification is a selection of at least one additional account of the user;
modifies the document privileges for the document to include the at least one additional account of the user in response to determining that the transaction does not violate a security policy; and
publishes the document to the at least one additional account.

17. A computer program product embodied in a non-transitory computer-readable storage media having a computer program residing thereon when executed by a computer hardware processor to perform the functions for managing documents within an identity management system, the computer program product comprising:

first program code, stored on the computer readable storage media, for receiving a document, the document being received within an authentication context of a user;

second program code, stored on the computer readable storage media, for determining a chain of custody for the document;

third program code, stored on the computer readable storage media, for storing the document as a verified document with a quantified confidence score in response to determining that the chain of custody is a verified chain of custody; and fourth program code, stored on the computer readable storage media, for setting document privileges for the document based on both the authentication context and the confidence score of the chain of custody.

18. The computer program product of claim 17, further comprising:

fifth program code, stored on the computer readable storage media, for receiving a transaction requesting modification to the document privileges;

sixth program code, stored on the computer readable storage media, for determining whether the transaction violates a security policy for validation of the user within the authentication context; and seventh program code, stored on the computer readable storage media, for modifying the document privileges for the document based on the received transaction in response to determining that the transaction does not violate the security policy.

19. The computer program product of claim 18, further comprising:

eight program code, stored on the computer readable storage media, for requesting additional assurances of an identity of the user for validation of the user in response to determining that the transaction violates the security policy;

ninth program code, stored on the computer readable storage media, for determining whether the additional assurances cure the violation of the security policy in response to receiving the additional assurances of the identity; and tenth program code, stored on the computer readable storage media, for modifying the document privileges for the document based on the received transaction in response to determining that the additional assurances cure the violation of the security policy.

20. The computer program product of claim 19, further comprising:

eleventh program code, stored on the computer readable storage media, for receiving the additional assurances from the user, wherein the additional assurances comprise credentials to validate the user within a second authentication context; and wherein the ninth program code further comprises:

program code, stored on the computer readable storage media, for determining whether the transaction violates a security policy for validation of the user within the second authentication context.

21. The computer program product of claim 20 wherein the authentication context is associated with a first account of the user, the first account including credentials to authenticate the user within the authentication context; and wherein the second authentication context is associated with a second account of the user, the second account including second credentials to authenticate the user within the second authentication context.

22. The computer program product of claim 21, wherein the account is selected from an identity management account of the user, an employer account of the user, and a social account of the user.

23. The computer program product of claim 17, wherein the first program code further comprises:

program code for receiving the document from an employment services provider, wherein the authentication context is associated with an identity management account of the user with the employment services provider.

24. The computer program product of claim 23, wherein the document privileges comprise a number of accounts of the user to which the document is published, wherein the document privileges are granularly selectable by the user, the computer program product further comprising:

sixth program code for receiving a transaction requesting modification to the document privileges, wherein the modification is a selection of at least one additional account of the user;

seventh program code for modifying the document privileges for the document to include the at least one additional account of the user in response to determining that the transaction does not violate the security policy; and eighth program code for publishing the document to the at least one additional account.

* * * * *